US011416381B2

(12) United States Patent
Shang et al.

(10) Patent No.: US 11,416,381 B2
(45) Date of Patent: Aug. 16, 2022

(54) SUPPORTING WEB COMPONENTS IN A WEB TESTING ENVIRONMENT

(71) Applicant: MICRO FOCUS LLC, Santa Clara, CA (US)

(72) Inventors: Er-Xin Shang, Shanghai (CN); Bin Zhou, Shanghai (CN); Chao-Lin Jiang, Shanghai (CN); Ran Li, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 68 days.

(21) Appl. No.: 16/931,821

(22) Filed: Jul. 17, 2020

(65) Prior Publication Data

US 2022/0019521 A1    Jan. 20, 2022

(51) Int. Cl.
*G06F 40/197* (2020.01)
*G06F 17/00* (2019.01)
(Continued)

(52) U.S. Cl.
CPC ...... *G06F 11/3688* (2013.01); *G06F 11/3664* (2013.01); *G06F 16/9027* (2019.01);
(Continued)

(58) Field of Classification Search
CPC ............. G06F 11/3688; G06F 11/3664; G06F 11/0709; G06F 16/986; G06F 16/9027;
(Continued)

(56) References Cited

U.S. PATENT DOCUMENTS 6,976,211 B2    12/2005  Lection et al.
9,690,764 B1 *   6/2017  Batni .................... G06F 40/103
(Continued)

OTHER PUBLICATIONS

Jaewon Oh et al., Web App Restructuring based on Shadow DOMs to Improve Maintainability, 2017 IEEE, [Retrieved on Mar. 14, 2022], Retrieved from the internet: <URL: https://ieeexplore.ieee.org/stamp/stamp.jsp?tp=&arnumber=8342877> 5 Pages (118-122) (Year: 2017).*

(Continued)

*Primary Examiner* — Anibal Rivera (57) ABSTRACT

This document describes techniques and apparatuses for supporting web components associated with a document object model (DOM) corresponding to a data file in a web testing environment. A user interaction, relative to a web page or web application from which the DOM is rendered, is monitored in the web testing environment. The monitoring identifies a target element selected by the user that is referenced in a shadow DOM associated with the DOM. One or more parent shadow host elements of the DOM are identified relative to the target element. The one or more shadow host elements define a reduced path, with respect to a tree data structure representing the DOM and the shadow DOM, for linking a document object of the DOM to the target element. Indicia identifying the one or more shadow host elements as linking the document object of the DOM to the target element are recorded. The recorded indicia define the reduced path for identifying the target element relative to the document object in the tree data structure during a replay of a recorded session of the user interaction. A target element may also be identified and replaced with a different object by referencing the one or more shadow host elements.

20 Claims, 7 Drawing Sheets

(51) Int. Cl.
*G06F 11/36* (2006.01)
*G06F 16/901* (2019.01)
*G06F 16/958* (2019.01)
*G06F 16/9535* (2019.01)
*G06F 40/123* (2020.01)
*G06F 11/34* (2006.01)
*G06F 40/143* (2020.01)
*G06F 40/117* (2020.01)
*G06F 16/951* (2019.01)

(52) U.S. Cl.
CPC ........ *G06F 16/958* (2019.01); *G06F 16/9535* (2019.01); *G06F 16/986* (2019.01); *G06F 11/3414* (2013.01); *G06F 11/3684* (2013.01); *G06F 16/951* (2019.01); *G06F 40/117* (2020.01); *G06F 40/123* (2020.01); *G06F 40/143* (2020.01)

(58) Field of Classification Search
CPC .. G06F 16/9535; G06F 16/954; G06F 16/345; G06F 16/972; G06F 8/38; G06F 8/65; G06F 40/143; G06F 40/103; G06F 40/123; G06F 40/137; G06F 40/14; G06F 11/3684; G06F 11/3414; G06F 16/9577; G06F 16/957; G06F 16/9574; G06F 16/11; G06F 16/2246; G06F 16/958; G06F 16/951; G06F 40/106; G06F 40/134; G06F 40/117
See application file for complete search history.

(56) References Cited

U.S. PATENT DOCUMENTS

| | | | |
|---|---|---|---|
| 9,767,211 B2 | 9/2017 | Cai et al. | |
| 10,025,762 B2 | 7/2018 | Punjabi | |
| 10,482,148 B2* | 11/2019 | Walker | G06F 16/954 |
| 10,545,749 B2* | 1/2020 | Gibbs | G06F 8/65 |
| 10,845,953 B1* | 11/2020 | Karppanen | G06F 40/143 |
| 2013/0145255 A1 | 6/2013 | Zheng et al. | |
| 2014/0047318 A1* | 2/2014 | Glazkov | G06F 8/38 715/234 |
| 2016/0057220 A1* | 2/2016 | Gibbs | G06F 8/65 709/203 |
| 2019/0171770 A1* | 6/2019 | Walker | G06F 16/954 |
| 2020/0089717 A1* | 3/2020 | Walker | G06F 16/954 |
| 2021/0266355 A1* | 8/2021 | Mendez | H04L 67/02 |

OTHER PUBLICATIONS

Warren He et al., ShadowCrypt: Encrypted Web Applications for Everyone, Nov. 3-7, 2014 IEEE, [Retrieved on Mar. 14, 2022]. Retrieved from the internet: <URL: https://dl.acm.org/doi/pdf/10.1145/2660267.2660326> 12 Pages (1028-1039) (Year: 2014).*

Robust Test Automation Using Contextual Clues; Rahulkrishna Yandrapally et al.; 19 pages; Feb. 21, 2014.

WaRR: A Tool for High-Fidelity Web Application Record and Replay; Silviu Andrica et al.; 8 pages; Jun. 2011.

* cited by examiner

SUPPORTING WEB COMPONENTS IN A WEB TESTING ENVIRONMENT

BACKGROUND

Web components are a suite of technologies and web platform application programming interfaces (APIs) that provide for custom, reusable, and encapsulated Hypertext Markup Language (HTML) tags (also referred to as elements), to use in web pages and web applications. The encapsulation of elements, meaning the bundling of data with the methods that operate on that data or the restricting of direct access to some of a programming object's components, enables rendering and functionality to occur separately from a web page or web application code. Custom elements are APIs that define new HTML elements.

The Document Object Model (DOM) interface treats an HTML document, or an Extensible Markup Language (XML) document, as a tree data-structure, with each node of the tree being an element (also referred to as an object), representing a part of the document. A web browser renders a DOM tree from the HTML or XML document. A shadow DOM is a portion (e.g., subtree) of a DOM tree that is rendered separately from the DOM tree, is not generally accessible for modification purposes, and can therefore be used to encapsulate elements. A shadow root is the root node element at the top of the shadow tree. A shadow host is the parent of the shadow root and is the DOM tree element that the shadow DOM is attached to.

Although web components provide the convenience of encapsulation to web developers, encapsulation itself is not friendly to web testing environments, e.g., web testing tools. For example, query languages used for navigating through an HTML or XML DOM tree may not directly support navigating through encapsulation. As another example, style sheet language selectors also may not directly support encapsulation. Certain web testing solutions attempt to address encapsulation by requiring specific code that travels full shadow DOM trees to identify encapsulated objects. However, even with these limited tools, if a shadow DOM is set to a closed-mode status, then the encapsulated elements cannot be accessed from external code. In this context, web software testing tools (e.g., scripts), that are used to test web applications or web pages (e.g., test an application, and/or measure web related system behavior and performance), are limited in their functional access and effectiveness because of the encapsulation of elements under the web components model.

DETAILED DESCRIPTION

This document describes example techniques and apparatuses for supporting web components associated with a DOM and shadow DOM in a web testing environment. A user interaction with a browser in a web testing environment is monitored. Responsive to the user selecting a target element, shadow host elements are identified in the DOM to define a reduced path, with respect to a tree-data-structure representing the DOM and shadow DOM, for linking a document object of the DOM to the shadow host elements and the target element. In one aspect, the reduced path is recorded, and in another aspect the reduced path is accessed during a replay of a recorded interaction with a browser session in the testing environment during which the target element is selected. The reduced path provides efficient access to the target element during replay by avoiding traveling the entire DOM or shadow DOM tree to identify the target element. In another aspect, during a real time use of the testing environment (separate from the record and replay context), the reduced path is identified and used to replace the target element with a different object for testing purposes.

The system and/or operations of methods described in this disclosure may be embodied in whole or in part as programming instructions, for example, firmware or software. The instructions may be stored on a transitory or non-transitory, machine-readable medium (e.g., computer/processor-readable medium), including, for example, a random-access memory (RAM), read-only memory (ROM), flash memory, cache memory, solid-state drive (SSD), hard disk drive (HDD), or combinations thereof, for execution on one or more processors in one or more computing systems. In some examples, implementing the operations of these methods may be achieved by one or more processors, or processor cores, reading and executing the programming instructions stored in the memory. In other examples, implementing the operations of the methods may be achieved using an application-specific integrated circuit (ASIC), such as a system-on-chip (SOC), and/or other hardware components either alone or in combination with programming instructions executable by one or more processors in one or more computing systems.

The example methods described in this disclosure may include more than one implementation, and different implementations may not employ every operation presented in a respective flow diagram, or may employ additional steps not shown in the respective diagram. Therefore, while the operations of methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

Figure 1:
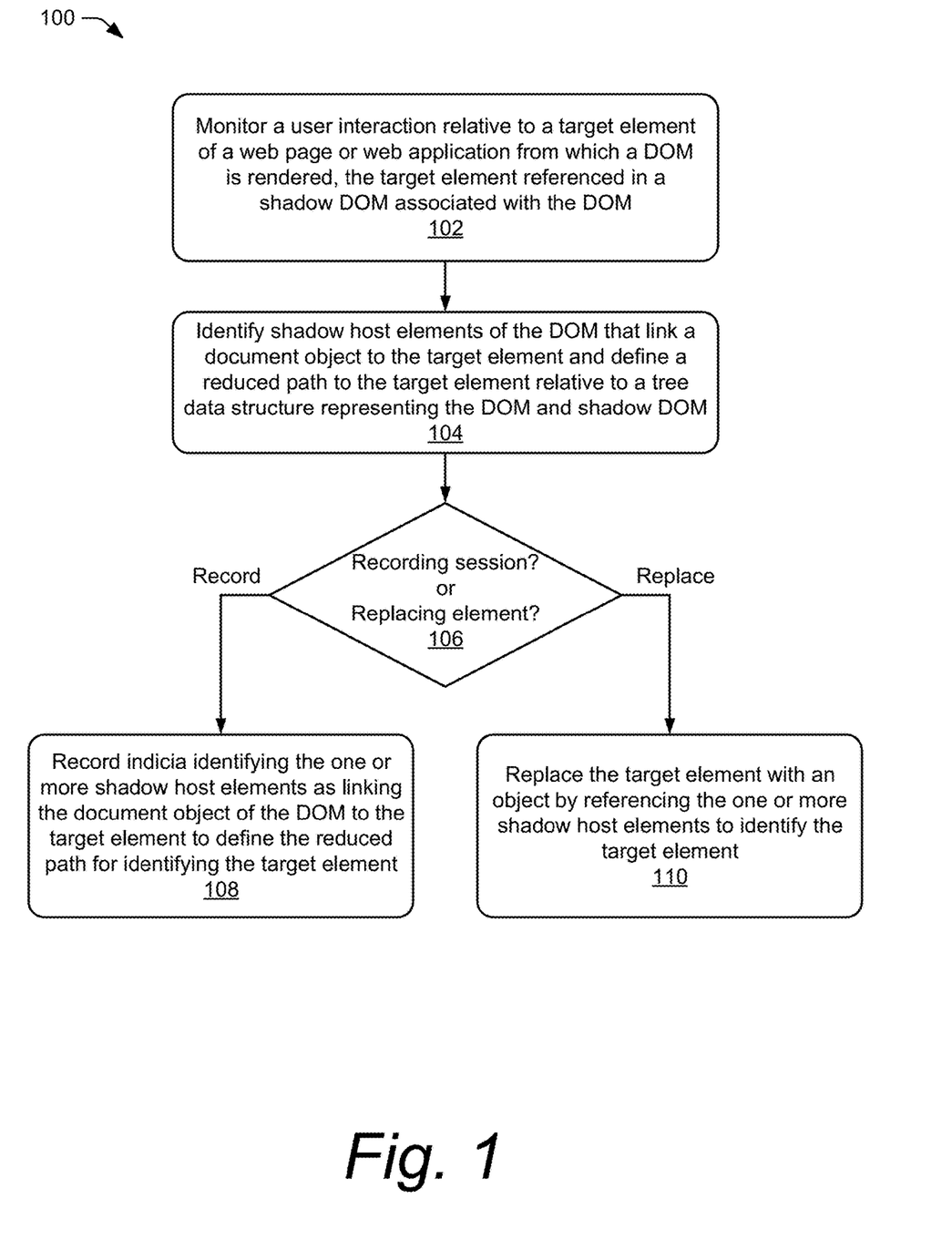
FIG. 1 is a flow chart illustrating an example method of supporting web components in a web testing environment.

FIG. 1 is a flow chart illustrating an example method 100 of supporting web components associated with a document object model (DOM) corresponding to a data file rendered by a browser or web application in a web testing environment. At 102, a user interaction is monitored relative to a web browser, web page, or web application executing on a computing device from which the DOM is rendered. Specifically, a user interaction relative to a target element of a shadow DOM associated with a DOM is monitored using a web testing tool in a web testing environment. This monitoring allows the target element (e.g., an object on the page) of a web document (e.g., HTML or XML document) to be identified when the user selects the object (e.g., with a mouse click or other input selection device or operation). In one example, the web testing tool includes agent code injected into the web browser, web page, or web application under test, and the agent code monitors the user interactions. When the user interacts with a target element in a web component (e.g. the target element is encapsulated in a shadow DOM), a DOM event is dispatched from the target element, and steps are taken by the web testing tool to identify the target element in the shadow DOM.

At 104, a first step to identify the target element in the shadow DOM is to identify the shadow host elements of the DOM that link a document object to the target element. These shadow host elements define a reduced path to identify the target element relative to a tree data-structure representing the DOM and shadow DOM. This reduced path is relative to otherwise having to potentially travel the entire shadow DOM, or multiple shadow DOMs associated with the DOM, to identify the target element. In one example, the shadow host elements are identified by identifying an ancestor queue of elements relative to the target element with respect to the tree data-structure. In another example, coordinates of the object selected by the user are captured. The coordinates identify a spatially referenced location (e.g., x,y location) of the object on a user interface of the computing device executing the browser, web page, or application, and are used to identify the parent shadow host elements associated with the target element.

At 106, it is identified whether a recording session is occurring, or whether replacing an element is occurring relative to the current user interaction with the browser, web page, or web application under test. A recording session indicates a user's activity associated with a browser, web page, or web application is being recorded and saved for testing purposes. Recording can include, for example, the user's view (e.g., browser or screen output), input (e.g., keyboard and mouse inputs), and logs of network events or console logs.

At 108, if a recording session is in process, then indicia identifying the one or more shadow host elements as linking the document object of the DOM to the target element are recorded. This recorded indicia defines the reduced path for identifying the target element relative to traveling the DOM and shadow DOM tree data-structure. The recorded indicia may be saved in an array data structure, a linked list data structure, or other feasible data structure for subsequent reference. This recorded indicia may be referenced later when a replay of the recorded session occurs in the testing environment. A replay of a recorded session is where all the user interactions are re-executed from the recorded session. During a replay, when a web component target element is replayed, the recorded indicia identify the target element using the reduced path of shadow host elements, from the document object to the target element, thereby avoiding potentially having to travel the entire DOM tree or shadow DOM tree to identify and replay the target element.

At 110, if a replace function for a target element is in process (e.g., to replace the target element with a different object for testing or script modification purposes), then the one or more shadow host elements identified are referenced to identify the target element. This process of identifying the one or more shadow host elements relative to the target element, whether for recording or replacing operations, provides a reduced path for identifying and accessing the target element in the testing environment. The reduced path provides an effective and efficient way to avoid having to potentially travel much of the DOM and shadow DOM tree data-structure to find the target element. This also avoids redundant computing and comparing of all the elements of the shadow DOM tree of the document, or multiple shadow DOM trees of the document, as the document can contain unlimited shadow DOM trees and/or elements. Other shadow DOM elements are not recorded and not included in the reduced path of shadow host elements.

Figure 2:
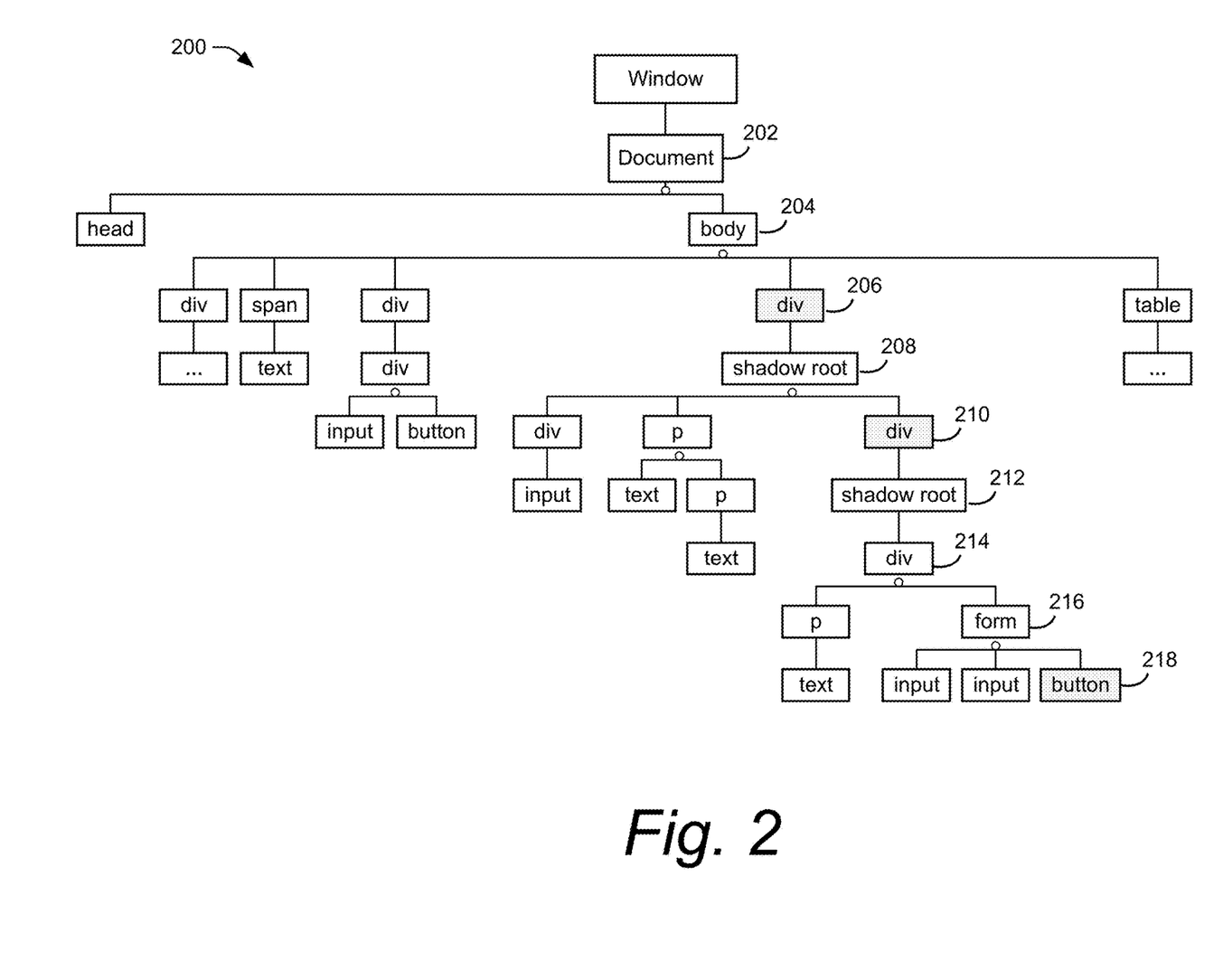
FIG. 2 is an example tree data-structure representing a DOM including shadow DOMs for reference with respect to supporting web components in a web testing environment.

FIG. 2 is an example tree data-structure 200 representing a DOM including shadow DOMs, corresponding to a data file rendered by a browser or web application, for reference with respect to supporting web components in a web testing environment according to methods described in this disclosure. Each node identified in the DOM tree data-structure represents an object of the document or an HTML tag element (e.g., head, body, div, span, p, input, button) that defines a structure on an HTML page, including the placement of text, images, and hypertext links. The example nodes shown include the following document object or HTML specification meanings:

"document" represents the HTML document;
<head> is a container for metadata;
<body> defines the document's body;
<div> defines a division or a section in an HTML document;
<span> is an inline container used to mark up a part of a text or document;
<p> defines a paragraph;
"text" defines text characters of the document;
<input> specifies an input field where a user can enter data; and
<button> defines a clickable button within which text and tags can be placed.

The "document" element (object) 202 identifies a root node of the DOM, and represents the document itself (e.g., the HTML or XML data file web page) under analysis as rendered by the browser or web application. The "div" element 206 identifies a first shadow host element of the DOM. The "div" element 206 references a child element that is a first shadow root element 208. The first shadow root element 208 is the root node, or entry node from an API perspective, of a first shadow DOM associated with the DOM 200.

The first shadow root element 208 references a child element that is a second shadow host "div" element 210 of the DOM. The second shadow host "div" element 210 references a child element that is a second shadow root element 212. The second shadow root element 212 is the root node, or entry node, of a second shadow DOM associated with the DOM 200. The "button" element 218 represents a leaf node of the DOM tree 200 and of the second shadow DOM identified under the shadow root element 212.

Under principles and examples of this disclosure, the "button" element 218 represents a target element identified by a user interaction with the browser, web page, or web application under test, for example, by a mouse click or other interactive selection of an object on the web page from which the DOM 200 is rendered. As previously discussed in reference to method 100 (FIG. 1), when a target element selected by a user (in a web browser or web application in a web testing environment) is associated with a shadow DOM, a first step to identify the target element in the shadow DOM is to identify the shadow host elements of the DOM that link a document object to the target element. In this context, and referencing the example DOM tree data-structure 200, the shadow host elements identified are shadow host "div" element 206 and shadow host "div" element 210, and these link the document object 202 to the target "button" element 218. These shadow host elements define a reduced path to identify the target "button" element 218 relative to the tree data-structure 200 representing the DOM and shadow DOMs.

Further referencing the example method 100 in context of the DOM tree data-structure 200, in one example the shadow host "div" elements 206 and 210 may be identified by identifying an ancestor queue of elements relative to the target "button" element 218 selected with respect to the tree data-structure. As shown in this example, this ancestor queue of elements includes "document" 202, "body" 204, "div" 206, "shadow root" 208, "div" 210, "shadow root" 212, "div" 214, and "form" 216. In another example, coordinates of the target "button" element selected by the user are captured. The coordinates identify the location of the element (object) on the graphical user interface of the browser, web page, or application, and are used to identify the shadow host "div" elements 206 and 210 associated with the target "button" element 218.

Figure 3:
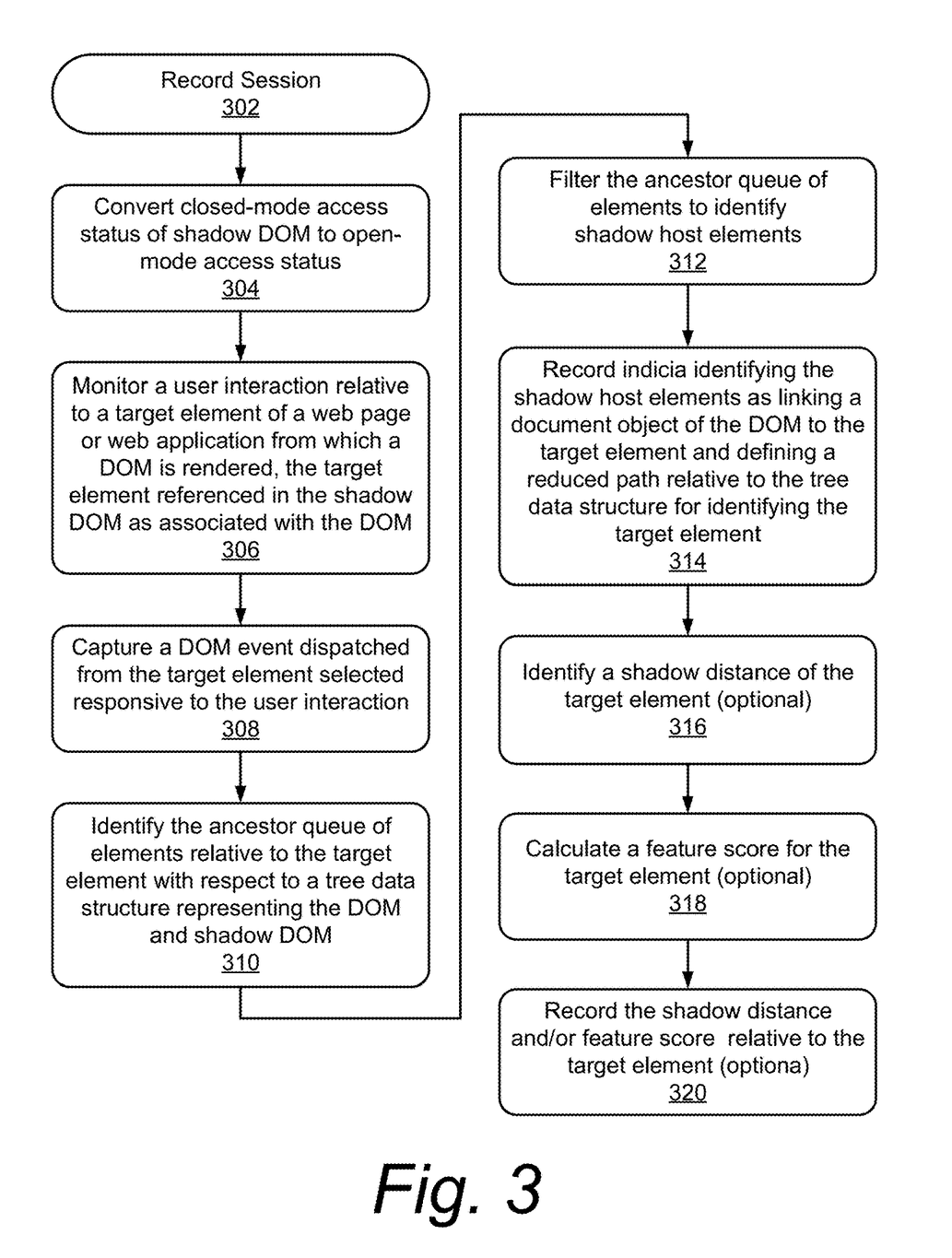
FIG. 3 is a flow chart illustrating an example method of supporting web components during a recording session in a web testing environment.

FIG. 3 is a flow chart illustrating an example method 300 of supporting web components during a recording of a session 302 of a user interaction with a web browser, web page, or web application in a web testing environment from which a DOM is rendered containing a shadow DOM. At 304, if the shadow DOM has a closed-mode status, meaning the underneath web component user interface elements are fully encapsulated by the browser and cannot be accessed from outside code, then convert the closed-mode access status of the shadow DOM to an open-mode access status. This converting may be performed, for example, by hooking a browser (associated with generating the DOM) using an application programming interface, or by modifying executable instructions of the browser. Converting the shadow DOM to an open-mode access status allows shadow elements of the shadow DOM to be accessed, for instance by agent code injected into the application under test in the web testing environment, for performing the method 300.

At 306, a user interaction with the web browser, web page, or web application from which the DOM is rendered in the web testing environment is monitored. Specifically, a user interaction relative to a shadow element in the shadow DOM associated with the DOM is monitored. At 308, a DOM event is captured, as dispatched from a target element selected, responsive to the user interaction being monitored. DOM events are actions that occur as a result of the user action or as result of a state change of the elements of a DOM tree. Client-side scripting languages can register various event handlers or listeners on the element nodes inside a DOM tree. Examples of HTML DOM events may include when a mouse pointer or other input selecting device moves over an element, when a user clicks the mouse or otherwise selects an object using an input device, when a web page has loaded, when an image has been loaded, when an input field is changed, when an HTML form is submitted, or when a user presses a key.

At 310, responsive to the DOM event, the ancestor queue of elements is identified relative to the target element selected with respect to the DOM (and underlying shadow DOMs) tree data-structure. This ancestor queue may be built using an array data-structure or other data construct to contain all the contexts that may help to find the selected target element from the web page under test. For example, as previously referenced with respect to the tree data-structure 200 (FIG. 2), this ancestor queue of elements, relative to target "button" element 218, includes "document" 202, "body" 204, "div" 206, "shadow root" 208, "div" 210, "shadow root" 212, "div" 214, and "form" 216.

At 312, the ancestor queue of elements is filtered to identify and keep only the shadow host elements of the DOM. Again, in the example tree data-structure 200, the shadow host elements identified from the filtering process are shadow host "div" element 206 and shadow host "div" element 210. These shadow host elements link the document object 202 to the target "button" element 218.

Although method 300 discloses, at 310, identifying the ancestor queue of elements relative to the target element and, at 312, filtering the ancestor queue of elements to identify the shadow host elements, an alternate embodiment (not shown) includes leveraging browser API functions to identify the shadow host elements. For example, The getRootNode( )method of the node interface returns the target element's root, which optionally includes the shadow root if it is available. Additionally, the property "host" of shadowRoot (e.g., shadowRoot.host) returns a reference to the DOM element the ShadowRoot is attached to. In this context, and in reference to the example tree data-structure 200 (FIG. 2), starting with target "button" element 218, the API function button.getRootNode( ) identifies the shadow root 212. Then, from the shadow root 212, the function shadowRoot.host identifies the shadow root "div" element 210. Then, from the shadow root "div" element 210, div.getRootNode( ) identifies the shadow root 208, and relative to the shadow root 208 the function shadowRoot.host identifies the shadow root "div" element 206.

At 314, indicia identifying the one or more shadow host elements as linking the document object of the DOM to the target element are recorded. The recorded indicia may be saved in an array data structure, a linked list data structure, or other feasible data structure, linking the document object to the shadow host elements and ultimately the target element (e.g., "document" 202, "div" 206, "div" 210, and "button" 218 of example tree data-structure 200). The recorded indicia define a reduced path to identify the target element 212 relative to the tree data-structure 200 representing the DOM and shadow DOMs. This recorded indicia may be referenced later when a replay of the recorded session occurs in the testing environment. During a replay, when a web component target element is replayed, the recorded indicia identify the target element using the reduced path of shadow host elements, from the document object to the target element, thereby avoiding potentially having to travel the entire DOM tree or shadow DOM tree to identify the target element.

At 316, a shadow distance of the target element may optionally be identified. A shadow distance represents a nested level depth of the target element in the shadow DOM tree data-structure of the document. This shadow distance value provides a mechanism to compare elements, in somewhat of a fuzzy comparison, to help identify the correct target element when searching the DOM during a replay session. This provides a more robust search tool for addressing unpredictable conditions like dynamic applications under test, or browser differentiations. For example, during a replay of a recorded session, multiple similar DOM elements may be found along the recorded composed path. The shadow distance is identified for each of the similar elements. The element with the closest matching shadow distance may be chosen as the correct element. If the shadow distance is different, then the found element in the replay is most likely not the same element that was selected during the record.

Calculations for identifying a shadow distance of an element may include the following example, simplified functions (A), (B), and (C), although others may also be considered:

$$shadowDepthDistance=\cos(\arctan(abs(recordShadowDepth-currentShadowDepth))) \quad (A)$$

where recordShadowDepth is the "shadow depth" identified for the element during a recording session;

currentShadowDepth is the "shadow depth" of the element found during replay of a recorded session; and "shadow depth" is defined as the nested level of the element as represented in the shadow DOM tree data-structure.

$$shadowDistance=0.25 \times shadowDepthDistance \quad (B)$$

where shadowDepthDistance<0.25

$$shadowDistance=-0.9 \times shadowDepthDistance+0.5 \quad (C)$$

where shadowDepthDistance≥0.8

At 318, a feature score of the target element may optionally be calculated. A feature of an element may be, for instance, the HTML tag name, the border size, the text contained in the element, how many child elements exist, the shadow distance, and the like. For example, if the tag name is "button" it may be assigned a feature score 0.1, and if not, then it may be assigned a feature score of zero (0). As another example, if the tag has a border, it may be assigned a feature score of 0.05, and if not, it may be assigned a feature score of zero (0). Similarly, the text of the target element may be recorded, and then subsequently on replay, if the recorded text matches the replay element's text, then a text-match feature score may be assigned of 0.3. On the other hand, if the text does not match on replay, then the feature score may be assigned 0.05.

At 320, the shadow distance and the feature score are recorded (optionally) relative to, or in association with, the target element. During a subsequent replay of a recorded session, the recorded feature scores calculated are summed up for each element identified, and the replay element with the feature score most closely matching the feature score of the recorded element is more likely the correct element to be replayed. The shadow distance may also be included as a feature and calculated as part of the feature score. Although the shadow distance and feature score are discussed as optional, it is recognized that to the extent these aspects are utilized, then the likelihood of success in identifying the target element generally increases.

Figure 4:
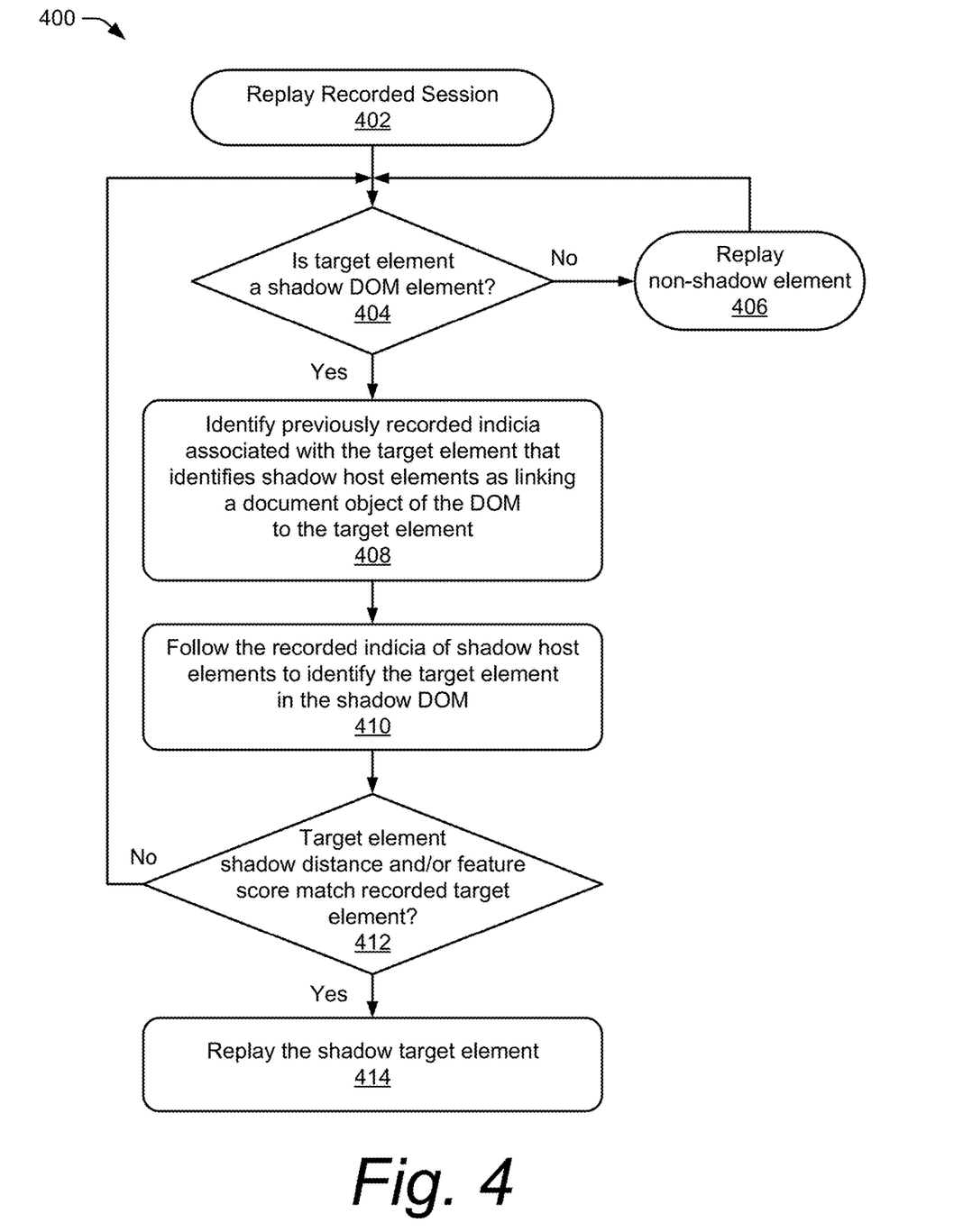
FIG. 4 is a flow chart illustrating an example method of supporting web components during replay of a recorded session in a web testing environment.

FIG. 4 is a flow chart illustrating an example method 400 of supporting web components during replay of a recorded session 402 in a web testing environment. At 404, if the target element in the replay step process of the recorded session is not a shadow DOM element, then replay the non-shadow element 406 and loop to get the next step replay target element. At 404, if the replay target element is a shadow DOM element, then identify the previously recorded indicia associated with the target element that identifies shadow host elements as linking a document object of the DOM to the target element. This previously recorded indicia is identified by referencing the array, linked list, or other data structure used to record the indicia. As an example with respect to the DOM tree data-structure 200, if the target "button" element 218 is identified, then the recorded indicia of shadow host elements 206 and 210, along with the document object 202, are identified. At 410, this recorded indicia, is followed (e.g., travelled) as the reduced path (e.g., relative to the entire DOM and shadow DOM tree data-structure) to identify the shadow target element.

At 412, the previously recorded shadow distance and/or feature score (e.g., see method 300) of the target element in replay are optionally checked and confirmed as matching, or as meeting a threshold, relative to the shadow distance and/or feature score of the recorded target element. For example, if the calculated shadow distance of the target element identified in the replay (e.g., replay element) matches the shadow distance recorded for the target element (e.g., recorded element), then the replay element is replayed at 414. On the other hand, if the shadow distance is different as between the replay element and the recorded element, or does not meet a threshold level, then the replay element is most likely not the same element that was selected and recorded during the recording session. Similarly, if the feature score of the replay element matches or meets a threshold relative to the feature score of the recorded element, then the replay element is replayed at 414. However, if the feature score is different between the replay element and the recorded element, or does not meet a threshold level, then the replay element is most likely not the same element that was selected and recorded during the recording session, so keep searching for another element. In one example, the shadow distance may be implemented as part of the feature score for simplicity. In another example, the shadow distance and feature score remain separate check points.

Figure 5:
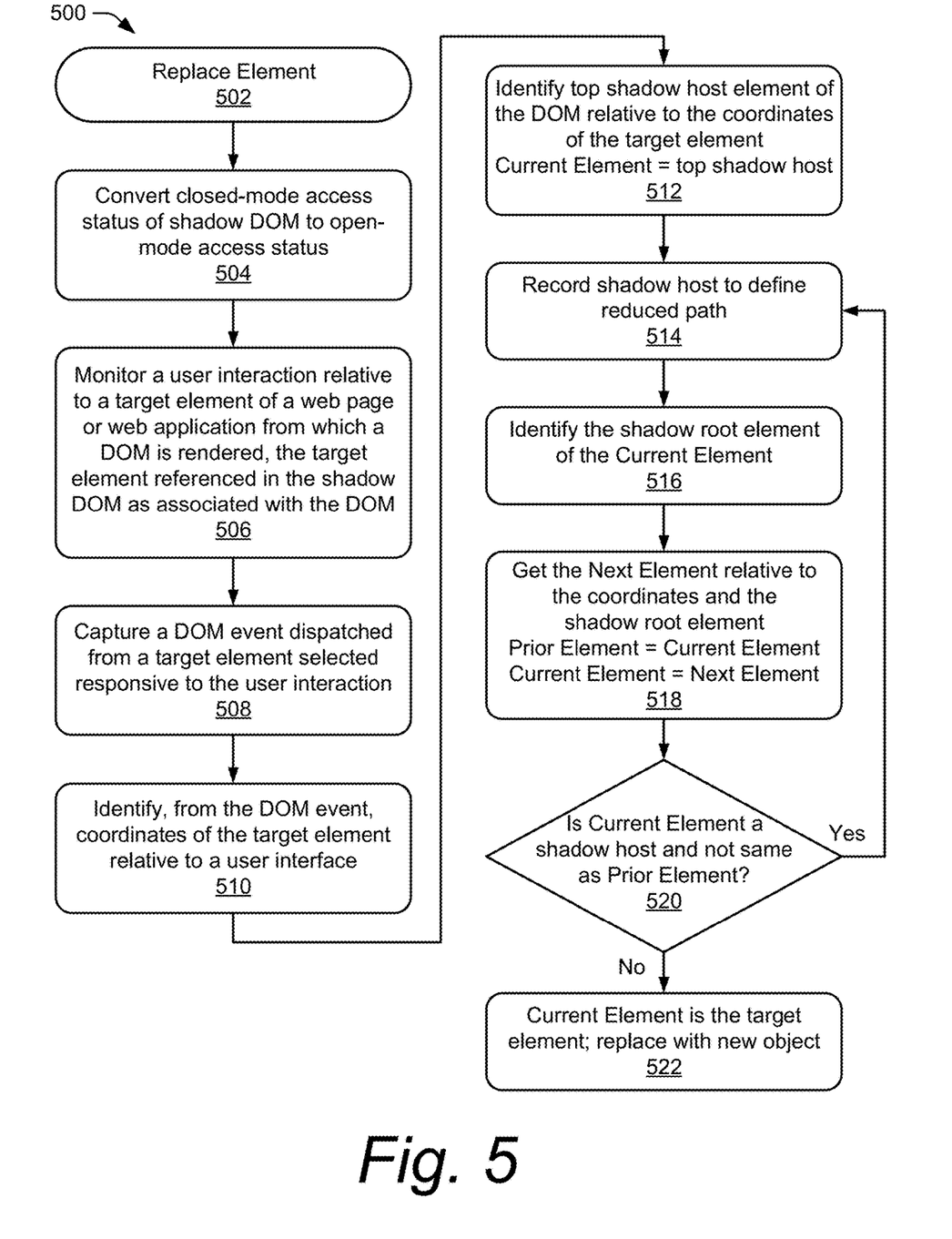
FIG. 5 is a flow chart illustrating an example method of supporting web components for replacing an element in a web testing environment.

FIG. 5 is a flow chart illustrating an example method 500 of supporting web components for replacing an element 502 during a user interaction with a web browser, web page, or web application in a web testing environment from which a DOM is rendered containing a shadow DOM. At 504, if a shadow DOM is detected and has a closed-mode status, then convert the closed-mode access status of the shadow DOM to an open-mode access status. As previously discussed, this converting may be performed by, for example, hooking a browser (associated with generating the DOM) using an application programming interface, or by modifying executable instructions of the browser. Converting the shadow DOM to an open-mode access status allows shadow elements of the shadow DOM to be accessed, for instance by agent code injected into the application under test in the web testing environment, for performing the method 500.

At 506, a user interaction with the web browser, web page, or web application in the web testing environment is monitored. Specifically, a user interaction relative to a shadow element in a shadow DOM associated with the DOM is monitored. At 508, a DOM event is captured, as dispatched from a target element selected by the user, responsive to the user interaction being monitored. As previously discussed, examples of HTML DOM events may include when a mouse pointer or other input selecting device moves over an element, or when a user clicks the mouse or otherwise selects an object using an input device, and so forth. At 510, coordinates of the target element selected are identified from the DOM event, the coordinates being relative to a user interface of the web browser, web page, or web application in the web testing environment.

At 512, a top shadow host element of the DOM is identified, relative to the coordinates identified from the target element DOM event. For example, the script, from which the DOM is represented, is searched to identify the top shadow host element of the DOM that has the coordinates identified from the target element selected. In one embodiment exemplifying a logical implementation, a Current Clement variable is assigned as the top shadow host element for evaluation. At 514, this top shadow host element is recorded to create indicia identifying one or more shadow host elements as linking the document object of the DOM to the target element. As previously discussed, the recorded indicia may be saved in an array data structure, a linked list data structure, or other feasible data structure. The recorded indicia define a reduced path of shadow host elements, from the document object to the target element, and may be referenced, for example, during a replay of a recorded session (see method 400), thereby avoiding having to travel much of the DOM tree or shadow DOM tree to identify the target element during the replay.

At 516, the child shadow root element of the Current Element (e.g., the shadow host) is identified, and at 518, the next element is identified under the shadow root that is associated with the coordinates of the target element. In one embodiment, a Prior Element variable is now assigned as the Current Element, and the Current Element is now assigned as the next element. At 520, if the Current Element (e.g., this next element just identified) is a shadow host, and the Current Element is not the same as the Prior Element then repeat the process of recording the shadow host to define the reduced path (at 514), identifying its shadow root element (at 516), and getting the next element relative to the coordinates and the shadow root element (at 518). At 520, again, if the Current Element is not a shadow host (e.g., it is a leaf element with no children), or is the same as the Prior Element, then at 522 the Current Element is identified as the target element and replaced with a new object (e.g., a different HTML tag element) in the web testing environment.

Figure 6A:
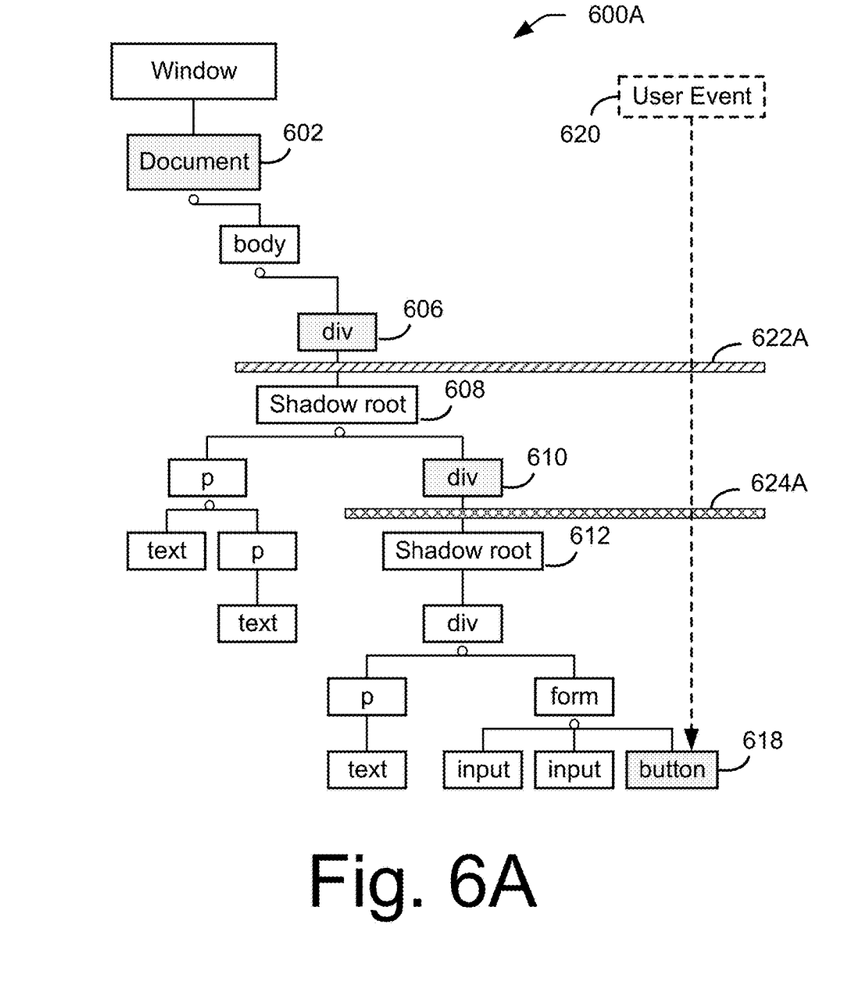
FIG. 6A is a tree data structure representing a DOM including shadow DOMs for reference with respect to replacing an element in a web testing environment.
Figure 6B:
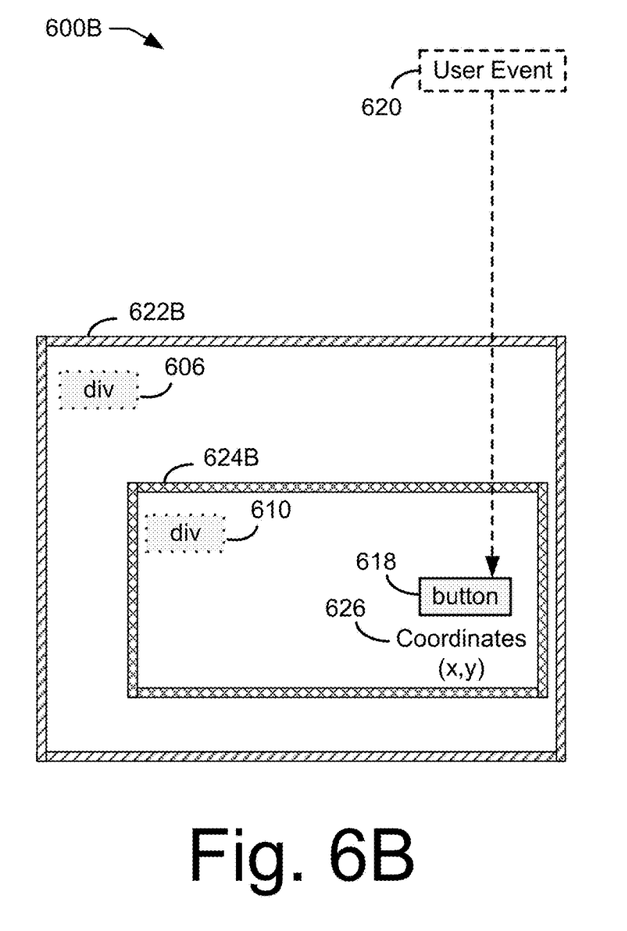
FIG. 6B is a representation of a graphical user interface of a web browser that renders the tree data-structure of FIG. 6A for reference with respect to replacing an element in a web testing environment.

Example pseudo logic for implementing steps 512, 514, 516, 518, 520, and 522 of method 500 may be as follows:
PriorElement=null;
CurrentElement=top shadow host
target=top shadow host
while ((CurrentElement exists) and
(CurrentElement is a shadow host) and
(CurrentElement is not PriorElement)) {
PriorElement=CurrentElement
CurrentElement=CurrentElement.getElementBeneathPoint (x,y)}
target=CurrentElement;

FIG. 6A is a tree data-structure 600A representing a portion of an example DOM, including shadow DOMs, illustrative for replacing an element in a web testing environment as discussed in method 500. FIG. 6B illustrates a partial graphical user interface 600B of a web browser or web application representing aspects of the DOM tree data-structure 600A of FIG. 6A, including aspects pertinent to replacing an element in the DOM in a web testing environment.

The DOM tree data-structure 600A identifies multiple elements, including "document" object 602, shadow host "div" element 606, "shadow root" element 608, shadow host "div" element 610, "shadow root" element 612, and target "button" element 618. These shadow host elements define a reduced path for identifying the target "button" element 618 relative to the tree data-structure 600A. User event 620 represents a user selecting an object to replace in a web browser, web page, or web application in the web testing environment. In this example, the user selects target "button" element 618 to be replaced. Under principles of this disclosure, and as referenced relative to methods 100 (FIG. 1) and 500 (FIG. 5), this user interaction is monitored and captured in the web testing environment. The horizontal line 622A, referenced with forward leaning vertical stripes, represents a top boundary of a shadow DOM identified under shadow host "div" element 606. The horizontal line 624A, referenced with cross hatch lines, represents a top boundary of a shadow DOM identified under shadow host "div" element 610.

Referring to graphical user interface 600B (FIG. 6B), the window 622B represents the area associated with shadow host "div" element 606 and the associated shadow DOM identified by horizontal line 622A shown in the DOM tree data-structure 600A. The window 624B represents the area associated with shadow host "div" element 610 and the associated shadow DOM identified by horizontal line 624A shown in the DOM tree data-structure 600A. User event 620 is the same user event referenced with respect to both the DOM tree data-structure 600A and the graphical user interface 600B. When user event 620 occurs (e.g., the user selects the target "button" element 618), the DOM event associated with the selection is captured, and the coordinates (x,y) 626 associated with the target "button" element 618 selected are identified from the DOM event. The coordinates are relative to the graphical user interface 600B of the web browser, web page, or web application in the web testing environment.

As discussed relative to method 500, upon capturing the DOM event and coordinates 626 from the user selecting the target "button" element 618, the top shadow host "div" element 606 of the DOM tree data-structure 600A is identified, relative to the coordinates 626 identified from the target "button" element 618 DOM event. This is represented by window 622B defined by the shadow host "div" element 606 and the associated shadow DOM identified by the horizontal line 622A shown in the DOM tree data-structure 600A. The shadow root element 608 is identified as a child of the shadow host "div" element 606. The next element under the shadow root 608 that is associated with the coordinates 626 of the target element is then identified, which in this example is shadow host "div" element 610. Because this next element 610 is a shadow host, its child shadow root element 612 is also identified. Shadow host "div" element 610 is represented by window 624B and the associated shadow DOM identified by horizontal line 624A shown in the DOM tree data-structure 600A. The next element under shadow root 612 that is associated with the coordinates 626 is then identified. This is target "button" element 618. Because the target "button" element 618 is identified as not being a shadow host (e.g., it is a leaf element with no children), or if it is identified as being the same element as the prior element evaluated (e.g., see step 520 of method 500), then this is the target element selected by the user event 620 to be replaced with a new object (e.g., HTML tag element) in the web testing environment.

Figure 7:
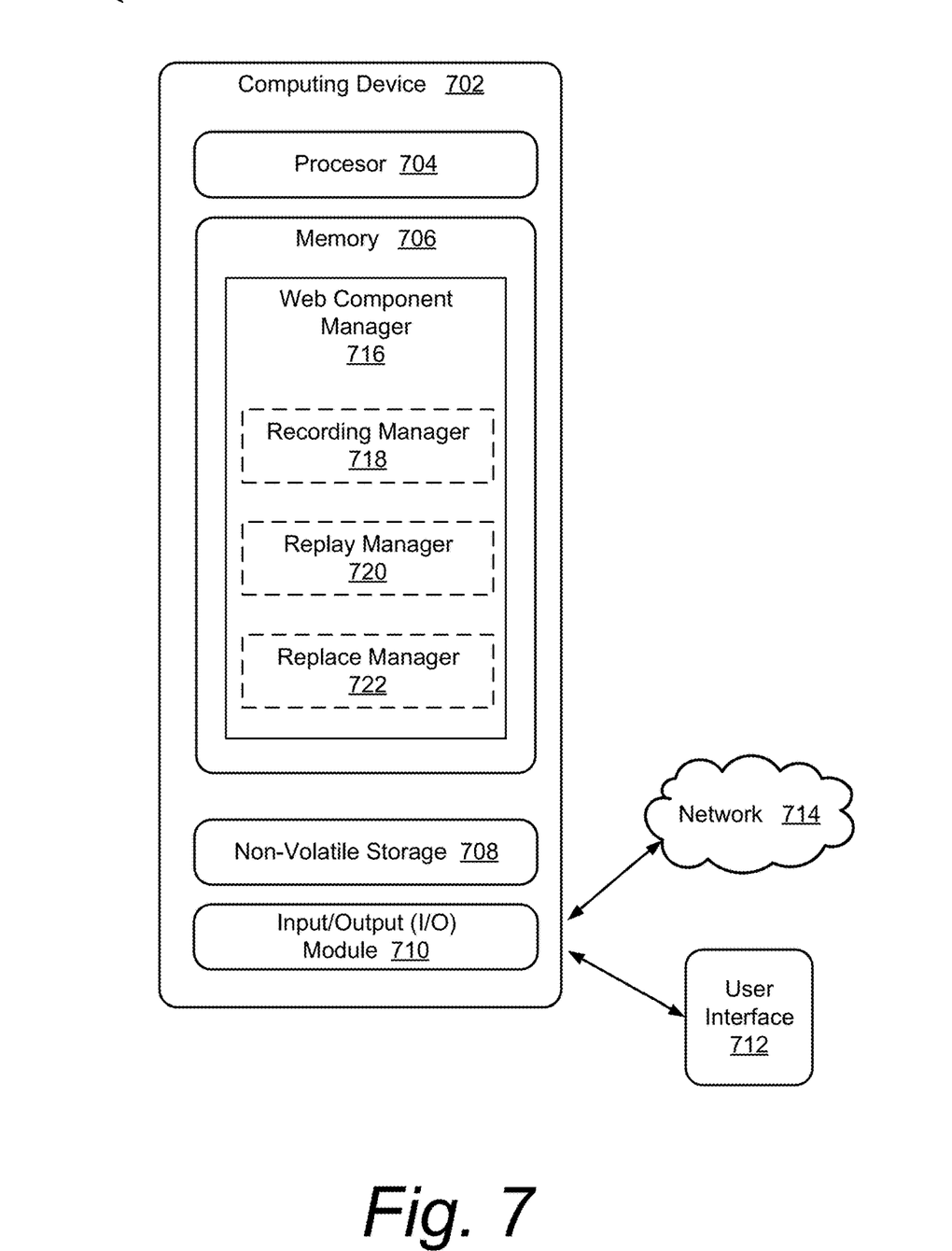
FIG. 7 is a block diagram of an example computing device having a web component manager for supporting web components in a web testing environment.

FIG. 7 is a block diagram 700 illustrating an example computing device 702 having functionality for supporting web components in a web testing environment according to principles and methods of this disclosure. The computing device 702 may include a processor 704, a memory 706, a non-volatile storage 708, and an input/output (I/O) module 710. The computing device communicates with a user interface 712 and a network 714 through the I/O module 710. The user interface 712 may be incorporated as part of the computing device 702, or implemented separate from the computing device as shown in the example illustration. As some non-limiting examples, the computing device 702 may be a server, desktop computer, notebook computer, mobile device, handheld device, or other computing device or system. The processor 704 may be any central processing unit (CPU) with one or more cores. The memory 706 may be any transitory and/or non-transitory, machine-readable media (e.g., computer/processor-readable media), such as a RAM, ROM, flash, cache, SSD, or a combination thereof, for storing program files, data, an operating system, and other executable instructions. The non-volatile storage 708 may be any ROM, flash, HDD, SSD, or similar storage device, for permanently storing program files, data, an operating system, and other executable instructions.

The user interface 712 may be a display, monitor, screen, touch screen, keyboard, mouse, other input or output device, or any combination configuration of these devices to display or otherwise provide information from the computing device to a user, and to allow the user to input information into the computing device. The network 714 may be any local area network (LAN), wide area network (WAN), cloud, multi-cloud, hybrid cloud, or private on-premise cloud computing environment, by which the computing device 702 may communicate with other networked devices, computing devices, or systems.

Memory 706 includes a web component manager 716 to enable supporting of web components in a web testing environment according to principles and methods described in this disclosure. In this example, the web component manager 716 is depicted simply as an application configured with executable instructions, for instance, firmware or software, for execution on the processor 704. However, the operations of the web component manager 716 may be implemented in whole or in part using an ASIC, such as a SoC, and/or other hardware components either alone or in combination with programming instructions executable by the processor.

The web component manager 716 may include manager modules to implement its functionality, for example, a recording manager 718, a replay manager 720, and a replace manager 722. These manager modules are shown separately in the illustration for discussion purposes, but may be combined, or further separated into additional modules, according to design and functional preference. Each of these manager modules function according to methods and principles described in this disclosure for supporting web components of a web browser, web page, or web application in a web testing environment. For example, the recording manager 718 may function as previously described with respect to methods 100 (FIG. 1) and 300 (FIG. 3), and in reference to the example DOM tree data-structure 200 (FIG. 2). The replay manager 720 may function as previously described with respect to methods 100 (FIG. 1) and 400 (FIG. 4), and in reference to the example DOM tree data-structure 200 (FIG. 2). Similarly, the replace manager 722 may function as previously described with respect to methods 100 (FIG. 1) and 500 (FIG. 5) and in reference to the example DOM tree data-structure 600A (FIG. 6A) and graphical user interface 600B (FIG. 6B).

Although the web component manager 716 is shown as an application with executable instructions in the memory 706, this is simply illustrative for discussion purposes. For example, the web component manager 716 may be executed locally on computing device 702 as shown, or executed remotely via network 714 relative to a separately networked computing device, such as using a software as a service (SaaS) model, or a combination of local and remote execution.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of supporting web components associated with a document object model (DOM), the method comprising:
    monitoring, by a computing device, a user interaction relative to a web page or web application from which the DOM is rendered and relative to a target element referenced in a shadow DOM associated with the DOM;
    identifying one or more shadow host elements of the DOM, wherein the one or more shadow host elements of the DOM define a reduced path, with respect to a tree data structure representing the DOM and the shadow DOM, for linking a document object of the DOM to the target element;
    recording, by the computing device, indicia identifying the one or more shadow host elements as linking the document object of the DOM to the target element, the recorded indicia defining the reduced path for identifying the target element relative to the document object of the DOM in the tree data structure;
    performing, by the computing device, a function comprising at least one of:
        identifying a shadow distance of the target element, the shadow distance being indicative of a nested level of the target element relative to an aspect of the tree data structure, and recording the shadow distance relative to the target element; and
        calculating a feature score for the target element, the feature score being indicative of features associated with the target element, and recording the feature score relative to the target element.

2. The method of claim 1 further comprising converting a closed-mode access status of the shadow DOM to an open-mode access status, the converting comprising at least one of hooking a browser associated with generating the DOM using an application programming interface, or modifying executable instructions of the browser.

3. The method of claim 1 wherein monitoring the user interaction relative to a target element comprises capturing a DOM event dispatched from the target element responsive to the user interaction.

4. The method of claim 1 wherein identifying one or more shadow host elements comprises, responsive to a DOM event associated with the target element, at least one of:
    identifying an ancestor queue of elements relative to the target element, with respect to the tree data structure, that link the document object to the target element, and filtering the ancestor queue of elements to identify the one or more shadow host elements;
    referencing a browser application programming interface function to identify the one or more shadow host elements relative to the target element; or identifying coordinates associated with the target element, relative to a user interface, to identify the one or more shadow host elements linking the document object of the DOM to the target element.

5. The method of claim 1 further comprising recording the user interaction and, responsive to a replay of the recording of the user interaction wherein the target element is selected by the user interaction, identifying the target element in the shadow DOM comprising referencing the recorded indicia defining the reduced path.

6. The method of claim 5 wherein referencing the recorded indicia comprises identifying the document object from the recorded indicia and following the one or more shadow host elements linked to the document object and the target element for identifying the target element.

7. The method of claim 1 wherein the features associated with the target element comprise indicia indicative of at least one of associated child elements, a tag name, a border size, a text contained, the shadow distance, or combination thereof.

8. The method of claim 1 further comprising, responsive to a replay of a recording of the user interaction wherein the target element is selected by the user interaction, identifying the target element comprising referencing the recorded indicia defining the reduced path and at least one of the shadow distance, the feature score, or combination thereof.

9. The method of claim 1 further comprising replacing the target element with an object,
wherein replacing the target element with an object comprises referencing the one or more shadow host elements to identify the target element, identifying coordinates associated with the target element, relative to a user interface, and referencing the coordinates to identify the one or more shadow host elements of the DOM, the reduced path, and the target element.

10. The method of claim 9 further comprising recording indicia identifying the one or more shadow host elements relative to the coordinates associated with the target element, the recorded indicia defining the reduced path for identifying the target element relative to the document object in the tree data structure.

11. The method of claim 9 further comprising referencing the coordinates to locate the target element in the DOM and identify the target element as a correct element if it is a leaf element of the shadow DOM with the identified coordinates associated with the target element.

12. A web testing system for supporting web components associated with a document object model (DOM), the web testing system comprising instructions that, when executed by a computing device, cause the computing device to:
monitor a user interaction relative to a web page or web application from which the DOM is rendered and relative to a target element referenced in a shadow DOM associated with the DOM;
identify one or more shadow host elements of the DOM, wherein the one or more shadow host elements of the DOM define a reduced path, with respect to a tree data structure representing the DOM and the shadow DOM, for linking a document object of the DOM to the target element;
record indicia identifying the one or more shadow host elements as linking the document object of the DOM to the target element, the recorded indicia defining the reduced path for identifying the target element relative to the document object of the DOM in the tree data structure; and
perform at least one of:

identify a shadow distance of the target element, the shadow distance being indicative of a nested level of the target element relative to an aspect of the tree data structure, and record the shadow distance relative to the target element; and
calculate a feature score for the target element, the feature score being indicative of features associated with the target element, and record the feature score relative to the target element.

13. The web testing system of claim 12 further comprising instructions that, when executed by the computing device, cause the computing device to identify the one or more shadow host elements, responsive to a DOM event associated with the target element, with respect to at least one of:
an ancestor queue of elements identified relative to the target element, with respect to the tree data structure, that link the document object to the target element, and filter the ancestor queue of elements to identify the one or more shadow host elements;
a browser application programming interface function to identify the one or more shadow host elements relative to the target element; or
coordinates associated with the target element, relative to a user interface, to identify the one or more shadow host elements linking the document object of the DOM to the target element.

14. The web testing system of claim 12 further comprising instructions that, when executed by the computing device, cause the computing device to record the user interaction and, responsive to a replay of the recorded user interaction where the target element is selected by the user interaction, identify the target element in the shadow DOM comprising referencing the recorded indicia defining the reduced path.

15. The web testing system of claim 12 further comprising instructions that, when executed by the computing device, cause the computing device to, responsive to a replay of a recording of the user interaction where the target element is selected by the user interaction, identify the target element comprising referencing the recorded indicia defining the reduced path and at least one of the shadow distance, the feature score, or combination thereof.

16. The web testing system of claim 12 further comprising instructions that, when executed by the computing device, cause the computing device to replace the target element with an object,
wherein replacing the target element with an object further comprises instructions that, when executed by the computing device, cause the computing device to reference the one or more shadow host elements to identify the target element, identify coordinates associated with the target element, relative to a user interface, and reference the coordinates to identify the one or more shadow host elements of the DOM, the reduced path, and the target element.

17. The web testing system of claim 16 further comprising instructions that, when executed by the computing device, cause the computing device to record indicia identifying the one or more shadow host elements relative to the coordinates associated with the target element, the recorded indicia defining the reduced path for identifying the target element relative to the document object in the tree data structure.

18. A non-transitory machine-readable storage medium storing instructions that, when executed by at least one computing device, cause the at least one computing device to enable a web testing system to support web components associated with a document object model (DOM), wherein the instructions cause the at least one computing device to:

monitor a user interaction relative to a web page or web application from which the DOM is rendered and relative to a target element referenced in a shadow DOM associated with the DOM;

identify one or more shadow host elements of the DOM, wherein the one or more shadow host elements of the DOM define a reduced path, with respect to a tree data structure representing the DOM and the shadow DOM, for linking a document object of the DOM to the target element;

record indicia identifying the one or more shadow host elements as linking the document object of the DOM to the target element, the recorded indicia defining the reduced path for identifying the target element relative to the document object of the DOM in the tree data structure;

perform at least one of:
identify a shadow distance of the target element, the shadow distance being indicative of a nested level of the target element relative to an aspect of the tree data structure, and record the shadow distance relative to the target element; or calculate a feature score for the target element, the feature score being indicative of features associated with the target element, and record the feature score relative to the target element.

19. The non-transitory machine-readable storage medium according to claim 18, wherein instructions further cause the at least one computing device to, responsive to a replay of a recording of the user interaction where the target element is selected by the user interaction, identify the target element comprising referencing the recorded indicia defining the reduced path and at least one of the shadow distance, the feature score, or combination thereof.

20. The non-transitory machine-readable storage medium according to claim 18, wherein instructions further cause the at least one computing device to replace the target element with an object,
wherein replacing the target element with an object comprises reference the one or more shadow host elements to identify the target element, identify coordinates associated with the target element, relative to a user interface, and reference the coordinates to identify the one or more shadow host elements of the DOM, the reduced path, and the target element.

* * * * *